Aug. 11, 1931.   A. T. BATEMAN ET AL   1,818,667
MOLDING APPARATUS
Filed July 30, 1928   2 Sheets-Sheet 1
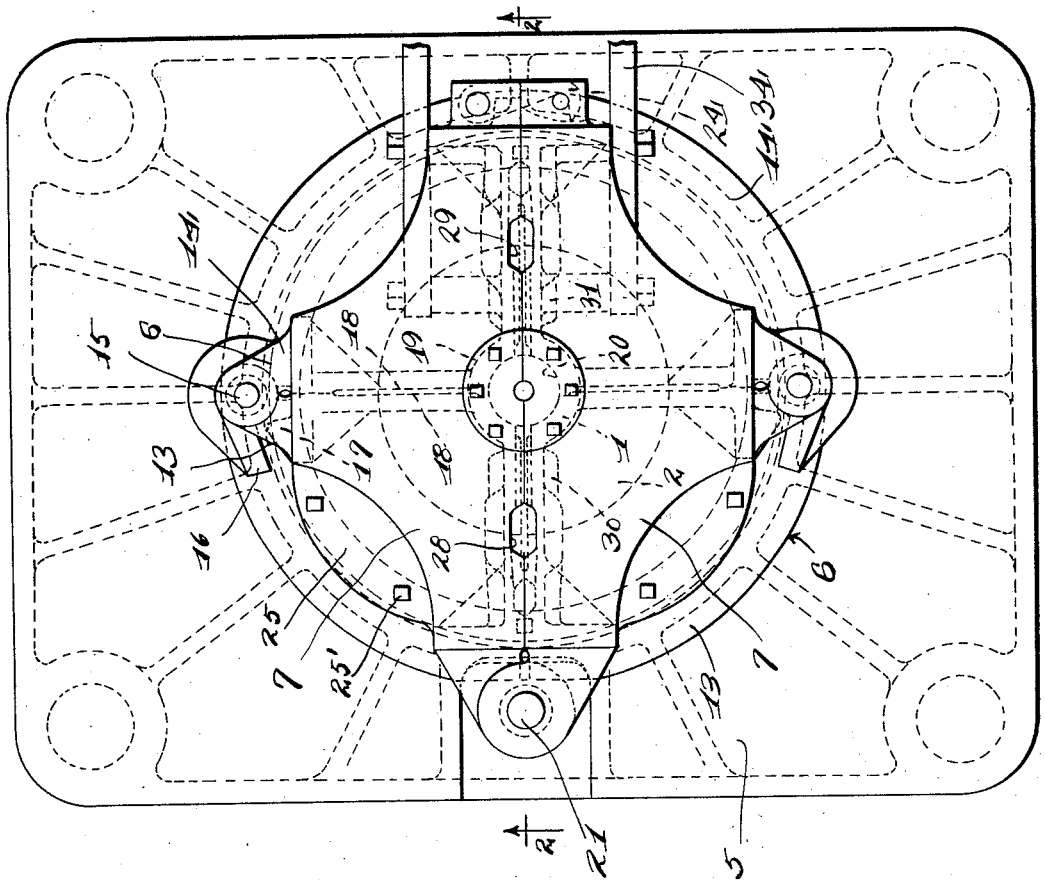
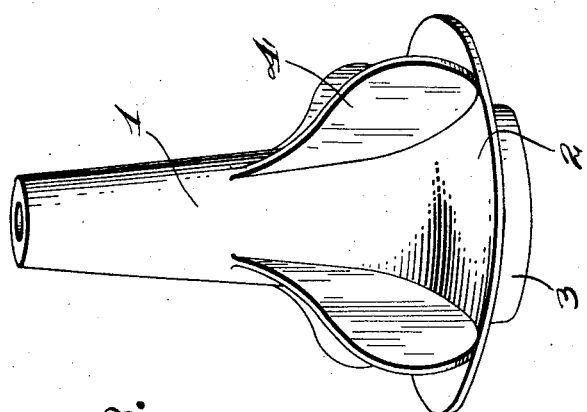
Inventors
Arthur T. Bateman
Andrew Irvine
By Whitmore, Hulbert, Whitmore & Belknap
Attorneys

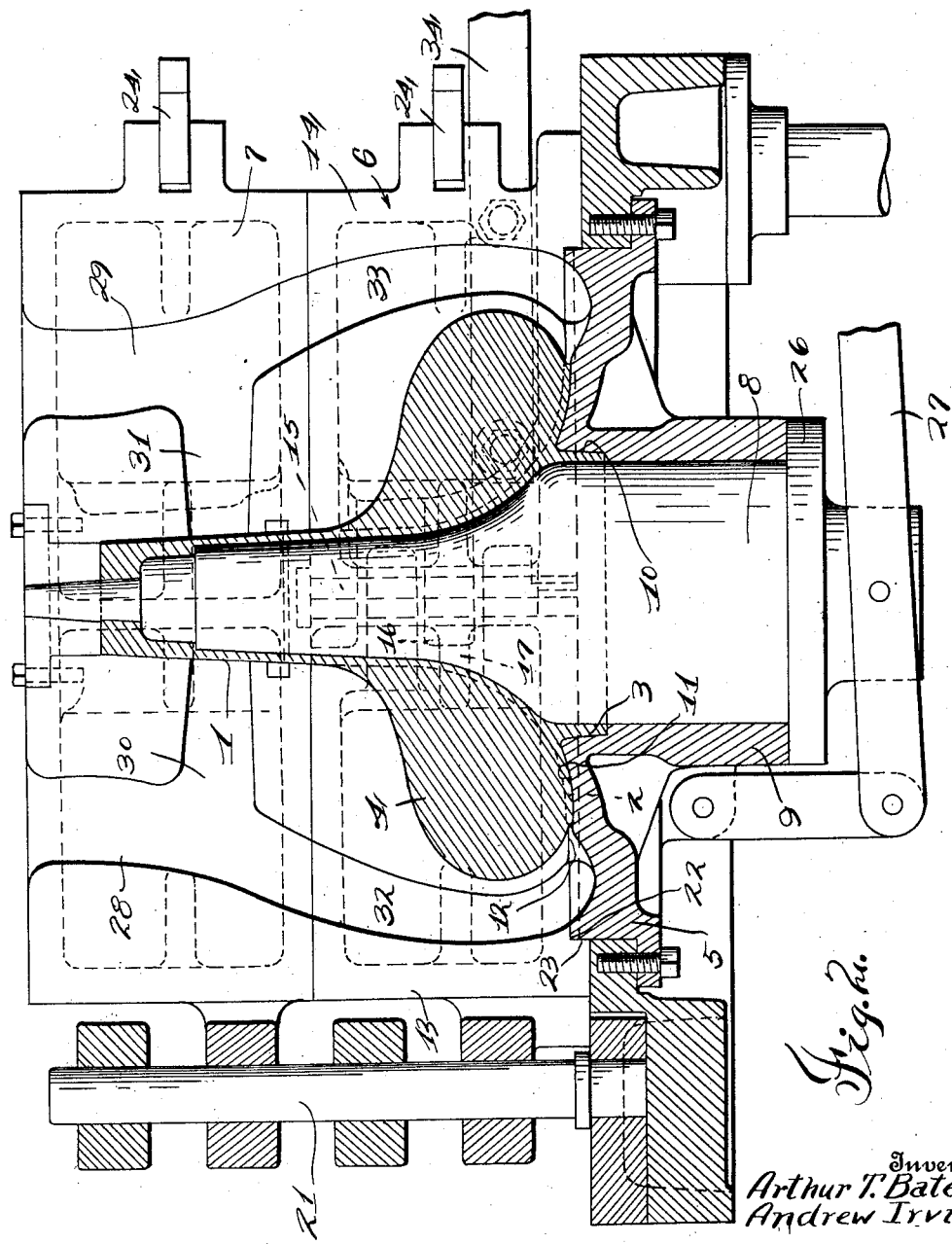

Patented Aug. 11, 1931

1,818,667

UNITED STATES PATENT OFFICE

ARTHUR T. BATEMAN AND ANDREW IRVINE, OF DETROIT, MICHIGAN, ASSIGNORS TO BOHN ALUMINUM & BRASS CORPORATION, OF DETROIT, MICHIGAN, A CORPORATION OF MICHIGAN

MOLDING APPARATUS

Application filed July 30, 1928. Serial No. 296,380.

The invention relates to molding apparatus and refers more particularly to molding apparatus for use in casting finned articles of complicated shapes. One of the objects of the invention is to so construct the molding apparatus that it may be operated at sufficiently high speed to maintain its temperature so that good castings may be made with the minimum number of failures. Another object is to make the molding apparatus sectional and to so arrange the sections that they may be readily moved to open position to clear the article. With these as well as other objects in view, the invention resides in the novel features of construction and combinations and arrangements of parts as more fully hereinafter set forth.

In the drawings:—

Figure 1 is a plan view of a molding apparatus embodying our invention;

Figure 2 is a cross section on the line 2—2 of Figure 1;

Figure 3 is a perspective view of an article cast in the molding apparatus.

The molding apparatus embodying our invention is designed for use in casting articles of complicated shape and more particularly finned articles, such as agitators. As shown in Figure 3, the article has the central hollow body 1 with the flared flange 2 and the axial annular flange 3 at the lower end. This article also has the series of fins 4 which are integral with the body and extend longitudinally thereof from the flange 2 and radiate therefrom in radial directions.

The molding apparatus has the permanent metal base 5, the series of permanent mold sections 6 superposed upon and adjacent to the base and the pair of permanent mold sections 7 superposed upon and adjacent to the mold sections 6. 8 is a permanent core slidably engaging the annular flanges 9 of the base and extending upwardly within the mold cavity formed by the base 5 and the mold sections 6 and 7 when in operative position. The base 5 has the mold cavity forming face 10 for use in forming that portion of the mold cavity in which the annular flange 3 is cast. This base also has the mold cavity forming face 11 which is adapted to cooperate with the mold cavity forming faces 12 at the lower ends of the mold sections 6 to form that portion of the cavity in which the flange 2 is cast.

The sections 6 comprise the sections 13 and 14 and to facilitate the description, the sections 13 will be called the main sections and the sections 14 the complemental sections. The main sections are co-pivotal, while the complemental sections are pivotally connected to the main sections by vertical pins 15. The swinging movement of the complemental sections to open position and relative to their respective main sections is limited by means of the projections 16 and 17 upon the respective sections adjacent to the pins 15. The sections 13 and 14 have adjacent mold cavity forming faces 18 when the sections are in operative position, which are adapted to cooperate to form that portion of the mold cavity in which the fins 4 are cast. These sections 13 and 14 have at their inner corners mold cavity forming faces 19 which are adapted to be in continuation of each other when the sections are in operative position and to cooperate to form that portion of the mold cavity in which the part of the body 1 adjacent the fins 4 is cast. The sections 7 have adjacent mold cavity forming faces 20 which are adapted to cooperate in the operative position of these sections to form the upper part of the body 1. The sections 13 and the sections 7 are journaled upon the same pin 21 which extends vertically upwardly from the base 5.

For locating the sections 6 in operative position the base 5 has the upwardly extending portion 22 which forms an annular shoulder for engaging corresponding annular shoulders 23 upon the sections 6 to limit their closing movement to operative position. These sections are held in operative position by suitable clamping means 24 at the adjacent ends of the sections 14. The sections 7 are fixedly secured to the sections 13 by means of bolts 25' extending through the lateral flanges 25 upon the sections 7 and into the sections 13. These sections 7 are also adapted to be held in operative position by clamping means which may be the same as the clamping means 24. The uppermost position of the core 8 is determined by the flange 26 upon the core engaging the lower end of the annular flange 9 of the base 5. This core is movable downwardly from the mold cavity by suitable means such as the lever 27.

The sections 7 have formed in their adjacent faces registering recesses for forming the passages 28 and 29 with the lateral branches 30 and 31 leading to the mold cavity forming faces 20. The main sections 13 have formed in their adjacent faces the recesses for forming the passages 32 in continuation of the passages 28 when the sections are in operative position, these passages 32 extending to the bottoms of the sections 13 and leading to the mold cavity forming faces 11 and 12.

The sections 14 have in their adjacent faces recesses forming the passage 33 in continuation of the passage 29 and arranged in the same manner as the passages 32. These passages 28, 30 and 32 and the passages 29, 31 and 33 may be used as gates and risers.

Assuming the parts of the molding apparatus to be in operative position and the casting to have been formed in the mold cavity, the clamps are released and the core 8 is withdrawn by downward movement, after which the sections 14 are swung outwardly and away from each other and relative to the sections 13 until the projections 16 engage the projections 17, after which continued outward movement of the sections 14 moves the sections 13 away from each other. The sections 7 are also moved outwardly and away from each other while the sections 13 are being separated. After these sections have been moved to clear the casting, the latter may be removed and the parts of the molding apparatus may then be returned to operative position for forming another casting. For facilitating the swinging of the sections 14, there are the handles 34 fixedly secured to these sections.

What we claim as our invention is:

1. In a molding apparatus the combination of a pair of pivotal mold sections, and a mold section pivotally connected to each of said first mentioned sections, all of said sections having mold cavity forming faces in their inner portions and mold cavity forming faces in their end portions arranged to cooperate in the opertive position of said sections in forming a mold cavity with a central portion and portions radiating therefrom.

2. In a molding apparatus, the combination of mold sections having faces adapted to cooperate in the operative position of the mold sections to form a mold cavity, said sections including co-pivotal sections and a section pivotally connected to each of the first mentioned sections, and means upon each of the last mentioned sections engageable with its first mentioned section for limiting the swinging movement of the former relative to the latter.

3. In a molding apparatus, the combination with a base of a series of pivotal mold sections and a plurality of superposed pivotal mold sections adapted to cooperate in their operative position to form a mold cavity with a central portion and portions radiating therefrom, and a pivot upon said base common to certain of said first mentioned sections and last mentioned sections.

4. In a molding apparatus, the combination with a base, of a series of pivotal mold sections adapted to cooperate with each other and with said base in the operative position of the sections to form a mold cavity with a central portion and portions radiating therefrom, and means upon said base for locating said sections in operative position.

5. In a molding apparatus, the combination with a base, of a pair of mold sections, a second pair of mold sections pivotally connected to said first mentioned pair, a pair of superposed mold sections, all of said sections and said base cooperating in the operative position of said sections to form a mold cavity with a central portion and portions extending longitudinally thereof and radiating therefrom, said first and second mentioned pair cooperating to form the radiating portions of the mold cavity, and a pivot upon said base common to said first mentioned pair and superposed pair of mold sections.

6. In a molding apparatus, the combination of a series of pivotal mold sections and a plurality of adjacent pivotal mold sections adapted to cooperate in their operative position to form a mold cavity, means upon the first mentioned sections for moving one from and upon predetermined movement of the other, and means for moving the adjacent mold sections from and upon movement of certain of the first mentioned sections.

7. In a molding apparatus, the combination of a series of pivotal mold sections and a plurality of superposed pivotal mold sections adapted to cooperate in their operative position to form a mold cavity with a central portion and portions radiating therefrom, means upon the first mentioned sections for moving one from the other upon a predetermined movement of the latter, and means for moving the superposed mold sections from the other sections.

8. In a molding apparatus, the combination with a base, of a plurality of pivotal mold sections adapted to cooperate with each other and said base in the operative position to form a mold cavity with a central portion and longitudinally extending portions radiating therefrom, said sections being arranged to be swung clear of the casting formed in the mold cavity.

9. In a molding apparatus, the combination with a base, of a series of pivotal mold sections and a plurality of adjacent pivotal mold sections, all of said sections and base cooperating in the operative position of the base to form a mold cavity with a central portion and longitudinally extending portions radiating therefrom, said section being arranged to be swung clear of the casting formed in the mold cavity.

In testimony whereof we affix our signatures.

ARTHUR T. BATEMAN.
ANDREW IRVINE.